United States Patent [19]

Kelly et al.

[11] Patent Number: 5,084,825
[45] Date of Patent: Jan. 28, 1992

[54] PROCESS CONTROL WITH GUARD BAND AND FAULT LIMIT

[75] Inventors: John H. Kelly, Phoenix; Mark S. Lanus, Tempe, both of Ariz.

[73] Assignee: BCT Spectrum Inc., Phoenix, Ark.

[21] Appl. No.: 164,746

[22] Filed: Mar. 7, 1988

[51] Int. Cl.⁵ .................... G01D 3/08; G06F 15/20
[52] U.S. Cl. .................. 364/507; 364/570; 364/551.01; 340/506; 340/511
[58] Field of Search .............. 364/580, 550, 552, 570, 364/580, 551.01, 508, 507, 497; 340/506, 511

[56] References Cited

U.S. PATENT DOCUMENTS

| | | | |
|---|---|---|---|
| 3,818,205 | 6/1974 | Wehrmann | 364/570 |
| 4,031,366 | 6/1977 | Hartung | 364/570 |
| 4,611,296 | 9/1986 | Niedermayr | 364/580 |
| 4,683,542 | 7/1987 | Taniguti | 364/550 |
| 4,695,965 | 9/1987 | Fujita et al. | 364/550 |
| 4,715,214 | 12/1987 | Tveter et al. | 364/552 |

Primary Examiner—Parshotam S. Lall
Assistant Examiner—V. Trans
Attorney, Agent, or Firm—Cahill, Sutton & Thomas

[57] ABSTRACT

A process control system is disclosed in which process variables are treated as mapped in n-dimensional space, where n is the number of orthogonal directions. Three functions, set, check, and term, provide the link between expected and actual conditions. The check and term functions operate on orthogonal coordinates. Each parameter has a guard band to provide a soft boundary for the parameter.

7 Claims, 4 Drawing Sheets

PROCESS CONTROL WITH GUARD BAND AND FAULT LIMIT

BACKGROUND OF THE INVENTION

The invention relates to process control systems and, in particular, to a system for controlling a process yet permitting the process to drift from a fixed set of conditions.

In the manufacture or treatment of articles using chemical processes, the quality of the product is determined, in part, by how well various process parameters are controlled, e.g. temperature and pressure. As a specific example, in the manufacture of semiconductor devices, a silicon wafer is subjected to a long sequence of steps in which each step has a number of parameters associated with it. As a more specific example, one may choose to deposit a layer of metal upon an oxide layer previously formed on a wafer. There are several ways to do this, but if one chooses plasma enhanced Chemical Vapor Deposition (CVD) the list of parameters includes RF power, pressure within the chamber, flow of each gas used in the mixture, wafer temperature, timing of events within the reactor. Uncontrolled parameters, in the sense that they are not directly controlled, are deposition rate, uniformity, and resistivity. One usually tries to obtain maximum deposition rate consistent with good uniformity and low resistivity.

As well known in the art, the results obtained are a compromise among competing effects. For example, one can increase deposition rate, but at the expense of uniformity. On the controlled side of the process, the parameters are balanced to give the optimum result. This often entails rather tight restrictions on the controllable parameters. When one attempts to automate a process to reduce human error or system errors, the result is frequent shutdowns because the process has drifted out of specification. Typically, the operator knows what parameter was out of specification, but has little else to indicate the source of the problem or the cure. The downtime often makes the automatic equipment seem even less efficient than the equipment it replaced.

In view of the foregoing, it is therefore an object of the present invention to provide a control system tolerant of process drift.

Another object of the present invention is to provide a process control system which facilitates finding causes of shutdowns.

A further object of the present invention is to provide a process control system which enables dynamic adjustment of process parameters.

SUMMARY OF THE INVENTION

The foregoing objects are achieved in the present invention wherein each process parameter is defined with three tolerance bands: a normal band, an alarm band, and a fault. Operation within the normal band, as detected by "set" and "check" operations, causes no further activity by the control system. If a process parameter should enter its alarm band, the control system then logs data when it enters and exits the alarm band. The process continues, it is not stopped. If a process parameter enters its fault band, the process is terminated. The system monitors the direction of the change and can take some corrective action, by varying other parameters. If a fault condition should occur, the logged data provides an "audit trail" to aid in diagnosis. If no fault condition occurs, the logged data is useful nevertheless, e.g. as indicative of a need for maintenance. In a preferred embodiment of the present invention, the normal band, alarm band, and fault band or "check" bands, are generated automatically from set functions, e.g. as a fixed percentage of the desired value.

BRIEF DESCRIPTION OF THE DRAWINGS

A more complete understanding of the present invention can be obtained by considering the following detailed description in conjunction with the accompanying drawings, in which.

DETAILED DESCRIPTION OF THE INVENTION

Figure 1:
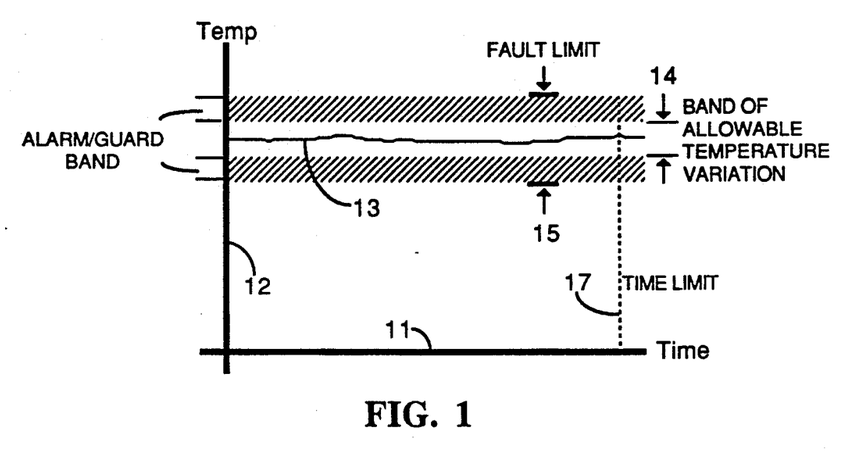
FIG. 1 illustrates the present invention in terms of a single pair of parameters, e.g. temperature and time.

FIG. 1 illustrates the present invention in terms of two parameters, e.g. temperature and time. Time is measured along X-axis 11 and temperature is indicated along Y-axis 12. Trace 13 represents the output of a suitable transducer which converts temperature to a voltage, the magnitude of which is then measured and monitored. As illustrated in FIG. 1, a representative process utilizing the present invention may not be able to maintain an article to be treated at a constant temperature. This is indicated by the waviness in trace 13. Positioned about trace 13 is band 14, which represents the allowable variation of temperature with time. So long as trace 13 remains within this band, the process is considered to be functioning normally. Band 14 is defined by an upper and lower boundary or limit to which the signal representative of temperature is compared.

Outside band 14 is a second band, herein referred to as alarm band 15. Band 15 provides a wider tolerance for variation in temperature. Specifically, band 15 represents the variation of temperature which could possibly be tolerated in a process, either directly or with some other corrective action. The corrective action could take the form of attempting to change the temperature to bring it within band 14 or an adjustment of some other parameter of the process such that the effect of the temperature change is minimized. It is frequently the case, for example, that increasing the temperature of a process decreases the process time while decreasing the temperature increases the processing time.

A temperature outside band 15 is considered a fault condition and causes the process to be terminated. Alternately the process is terminated when completed at a predetermined time, as indicated by time 17.

The advantage of defining alarm and fault limits is that it enables one to sense an abnormality in the system before the abnormality causes unusable product to be produced. In addition, by recording the temperature and time when the alarm condition takes place one can obtain a record helpful in diagnosing failures of the equipment to carry out the process successfully. While one could continuously monitor the temperature for this purpose, the result would be a large amount of data, the majority of which is not significant.

FIG. 1 also illustrates three terms used to describe the present invention, namely, "set", "check", and "term". At some initial time, the temperature is set by suitable apparatus controlling a heater or other device for heating the article to be processed. The check function is then performed to see whether or not, in fact, the correct temperature has been achieved. The term function is used to terminate the process after the expiration of the normal processing period or upon a fault condition. As applied to FIG. 1, these functions can be performed on the value or Y-axis. Only the term and check functions can be performed on the time axis. In a sense, the set function is implicit in the term operation as applied to the X-axis. Not only are these operations applied to both axes but they occur in complementary pairs, comprising check and term functions. For example, if the term function operates on the time axis, then the check function operates on the value axis and verifies that the set function achieved its goal of maintaining a process variable at a steady state value. Similarly, if the term function operates on the value axis then the check function operates on the time axis and verifies that the function occurred within an acceptable time limit. This set of complementary observation functions executing continuously on both axes of control ensures reliability since it defines a four-sided window around the set functions and will not allow the set point to wander outside of the window. This window can be made as small or as large as necessary.

Figure 2:
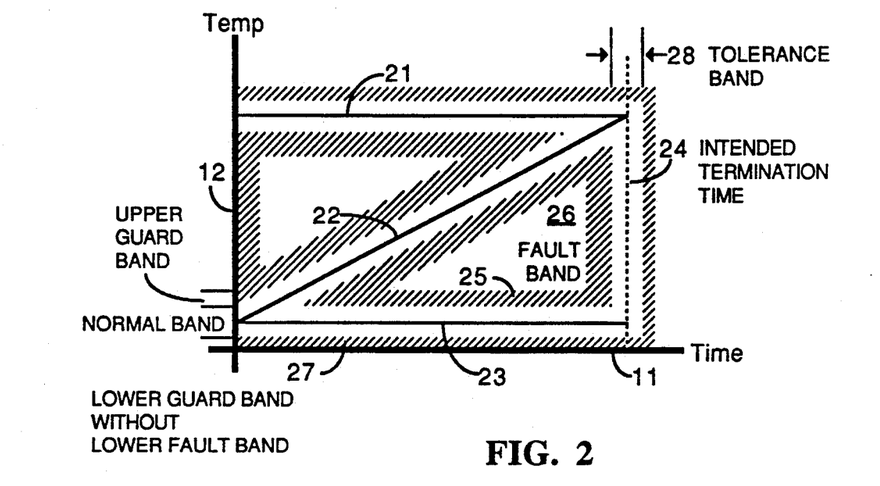
FIG. 2 illustrates terminology used to describe the present invention.

FIG. 2 illustrates several different types of control conditions. For example, parameter 23 is the starting value of parameter 22. Band 27 is similar to band 15 in FIG. 1. Band 27 may not be present if the normal band around parameter 23 is large enough, i.e. extends down to the X-axis. Parameter 21 is similar to parameter 13 in FIG. 1. Parameter 22 is one in which there is expected to be a continuous rate of change during a given interval. Parameter 24 illustrates the situation where time is the measured quantity and an event is expected within a certain interval of that predetermined time.

Specifically, in accordance with the present invention, the boundaries for a given condition need not always be paired, as illustrated by parameter 23. Parameter 23 has a normal band, bounded on the top by alarm band 25 and on the bottom by band 27. Parameter 3 is further bounded by fault band 26. There is no lower fault band since it is either undesirable or unnecessary to monitor those values of the parameter. For example, if the parameter were the temperature of the lower electrode in a plasma enhanced CVD reactor, the temperature of the lower electrode is unlikely to decrease of its own. What is important however is that the temperature of the lower electrode not exceed some predetermined limit. Therefore, increases in temperature are monitored, and can cause an alarm or fault, whereas decreases in temperature can in this example, only cause an alarm not a fault. For other parameters where X-axis 11 does not represent zero, alarm band 27 and a fault band are provided.

A similar consideration applies to a ramp function. For proper operation of a ramp function, one first sets a parameter to a desired value and then monitors the response of the system to see if that value is obtained. Depending upon the particular system involved, one can achieve a ramp function by simply setting the desired endpoint and relying on the inertia of the system to achieve that endpoint in a more or less linear fashion. Alternately, one can divide the ramp into a plurality of steps and more tightly control the operation of the apparatus, guiding it along the desired response curve. For this to happen, the system must monitor not only direction but also high and low values for both the value of the parameter and time. For example, during a ramp-up, one would use the set function to initiate the change and then a check-high function to assure that the system did not overshoot the mark, and a check direction function to assure that the ramp is occurring in the proper direction. Predetermined time 24 has boundary 28 associated therewith for determining proper operation of a ramp cycle. As with other parameters, the value for the time parameter has a normal band, alarm band, and a fault band. During a ramp operation it is desirable to check both boundaries on the time value to assure that the ramp did not occur too steeply or too gradually.

Figure 3:
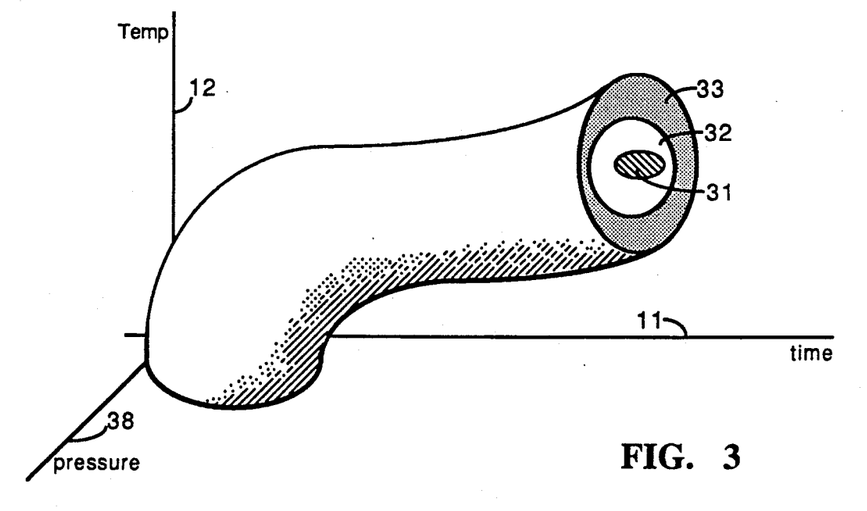
FIG. 3 illustrates the present invention as applied to three parameters.

FIG. 3 illustrates another aspect of the present invention wherein the parameters are interpreted as operating in n-dimensional space along mutually perpendicular axes. As before, one can construe X-axis 11 as corresponding to time and Y-axis 12 as corresponding to some other parameter, e.g. temperature. In addition, Z-axis 38 corresponds to a third parameter, e.g. pressure. As illustrated in FIG. 3, these parameters are interrelated, such that an increase in temperature can be corrected by a decrease in pressure and vice versa. It is understood by those of skill in the art that these corrective measures cannot be made without limit. Thus one continues to have a set of boundaries but the set defines a multidimensional figure. This is illustrated in FIG. 3 wherein normal band 31 increases in the Z-axis but decreases along the Y-axis, and vice versa. Alarm band 32 and fault band 33 need not have the same shape as normal band 31, depending upon the results produced by the different combinations of temperature, pressure and time. By controlling a process in accordance with these interrelated parameters, one not only obtains an audit trail and reduced down time, but also more consistent results by enabling corrective action to occur dynamically.

Figure 4:
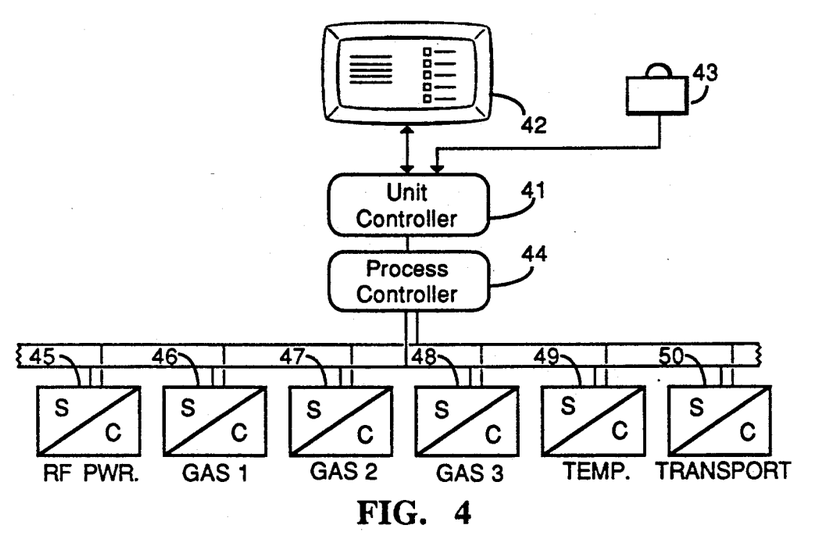
FIG. 4 illustrates a system for implementing the present invention.

FIG. 4 illustrates apparatus for carrying out the present invention. As an example of an embodiment of the present invention, the apparatus of FIG. 4 illustrates that portion of a plasma enhanced chemical vapor deposition reactor concerned with running a specific process step, or closely related steps, on a single wafer or single batch of wafers. For this purpose, unit controller 41, which typically comprises a microprocessor such as a 68020 as sold by Motorola, Inc., is assigned responsibility for controlling all functions associated with processing a wafer. The human interface is provided by terminal 42 and track ball 43. At the lower end, unit controller 41 interfaces with process controller 44 which is specifically concerned with implementing a process as a series of set, check and term functions. This is carried out by communicating over a network to a plurality of device controllers 45-50. These device controllers typically comprise a microcontroller, such as a 68HC11, as sold by Motorola, Inc., and connected with a plurality of transducers, appropriate for the particular task. The interface of the 68HC11 to various transducers themselves are well known per se to those of ordinary skill in the art. For example, device controller 45 controls the level of RF power and may also incorporate automatic tuning (impedance matching) apparatus to assure a resistive load for the RF power generator. Device controllers 46-48 include solenoids, mass flow controllers, and pressure sensors suitable for controlling and monitoring the flow and pressure of gas within a plasma reactor. Device controller 49 comprises suitable isolation and power control means for operating a heater as well as suitable temperature sensing apparatus for monitoring the temperature within the chamber. Preferably the temperature nearest the semiconductor wafer being processed is monitored. Device controller 50 is concerned with operation of a wafer transport to load and unload the plasma reactor. It comprises a plurality of transducers for actuating the transport and sensing the position of the wafer. In a preferred embodiment of the present invention each device controller operates in a polled mode on the network. In the event of an alarm or a fault, the message is returned to the process controller 44 which, in turn, relays the message to unit controller 41. In a preferred embodiment of the present invention, the data is logged upon entry and exit of the alarm band and upon entry of the fault band. This data is stored for recall by the user at terminal 42 or at a printer (not shown)

Figure 5:
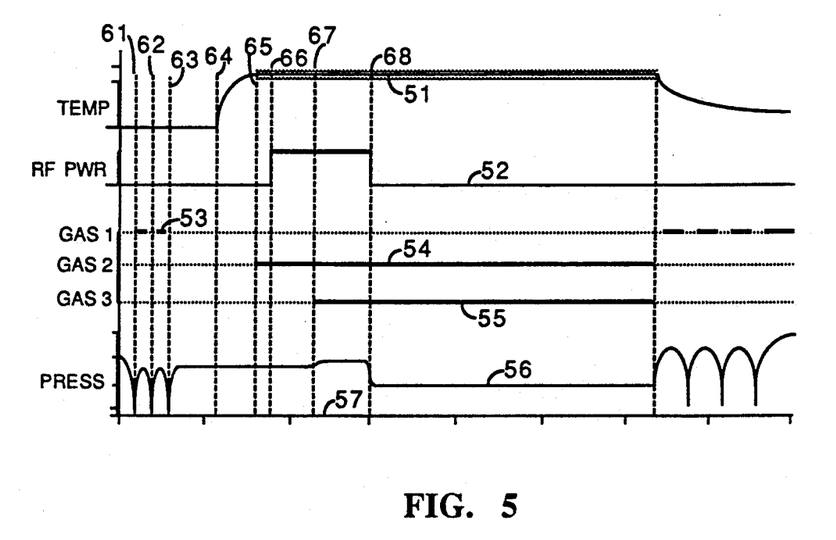
FIG. 5 illustrates a process controlled in accordance with the present invention.

FIG. 5 illustrates the control of a process for depositing tungsten on a semiconductor wafer. In FIG. 5, trace 51 corresponds to the temperature at or near the wafer, trace 52 represents RF power, traces 53, 54, and 55 represent, respectively, the application of particular gases, trace 56 represents the pressure within the plasma reactor, and trace 57 represents time. In general, the process entails cycling the reactor through several pump downs and pressurizations to purge the reactor of atmosphere, increasing the temperature of the wafer, applying a gas to the reactor, then turning on the RF power and, at some point, adding a second gas. The process is then terminated, the reactor purged, and the wafer removed. This is controlled in accordance with the present invention by providing what is herein referred to as a unit step. A unit step is the smallest time interval for a given operation to occur. The unit step may not be the same time period, assuming that the set and check functions are not applied to the time axis. For example, the intervals defined between times zero, 61, 62, and 63 are relatively uniform and represent a time frame appropriate for the purge and pump down of the reactor. Conversely, the time interval from time 63 to time 64, during which the reactor is permitted to stabilize, is relatively long and does not require frequent checking. During the interval between times 64 and 65, the temperature is ramped upwardly, which can be done as a single unit interval or as a plurality of unit intervals, depending upon the particular process being carried out. Similarly with the remainder of the process, the unit interval is chosen as appropriate for the particular task to be accomplished. Specifically, at time 65 the temperature has reached its set point and the second gas starts flowing; at time 66, the flow has stabilized and RF power is applied; at time 67, the third gas starts flowing; at time 68, the power is shut off while the temperature is maintained. The particulars of the process are immaterial to the present invention, cf. U.S. Pat. No. 4,737,474 for a detailed description of a process. The point here is simply that the unit interval need not be of a fixed length.

Figure 6:
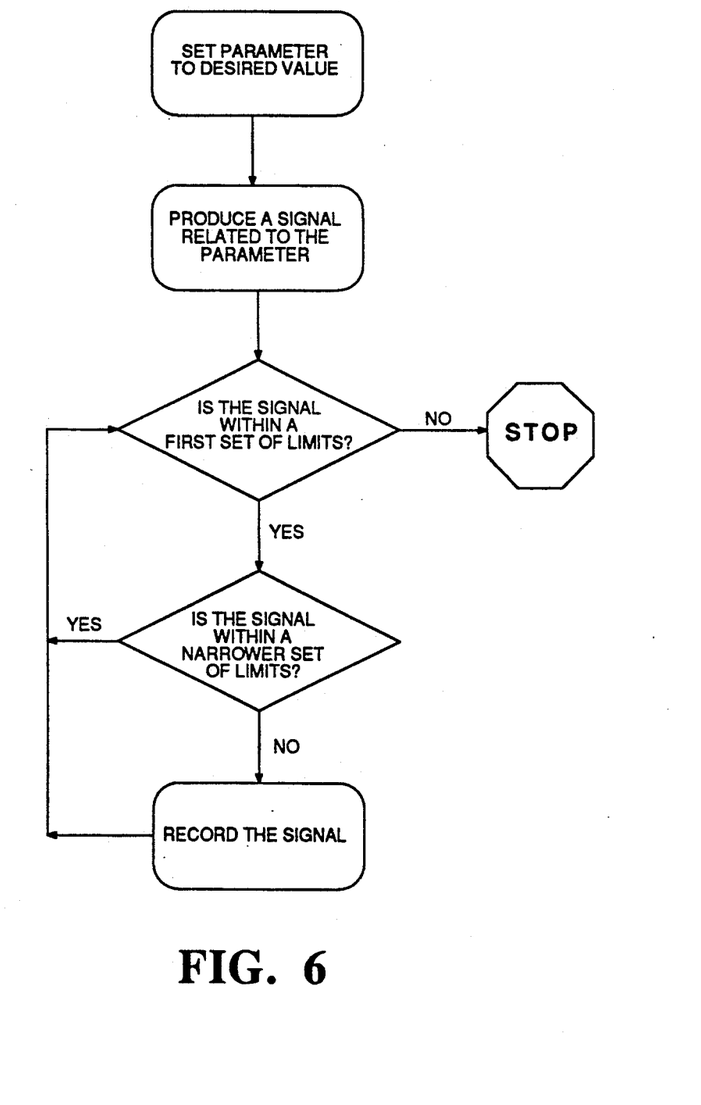
FIG. 6 illustrates a flow chart in accordance with the present invention.

FIG. 6 illustrates a flow chart of the process in accordance with the present invention. In successive steps, a parameter is set to a desired value; an electrical signal is produced which is related to the parameter; and the magnitude of the signal is checked against first and second sets of limits wherein the first set is wider than and includes the second set. Specifically, if the signal is not within the first set of limits, the process is terminated, else the process continues. If the signal is within the second set of limits, the process continues. If the signal is between the first and second sets of limits, then the signal is recorded. It is this last step which greatly facilitates tracking process problems, but without generating large amounts of essentially useless data.

Appendix A illustrates in pseudo-code the check task function. This task provides the check function for the parameters to assure the intended effect is produced. Check_analog checks the analog inputs from device controllers 45-50. Check _Digital checks digital inputs from device controllers 45-50. Check_Enum checks enumerated inputs (high level commands, e.g. load wafer unload wafer) from device controllers 45-50.

Appendix B illustrates in pseudo-code a routine used to send data to the device controllers, therein referred to as "RDACs" (Remote Data Acquisition Controller). This provides the "set" function.

Appendix C illustrates in pseudo-code a routine for receiving data from the device controllers. This routine is used during the "check" operation.

Appendix D illustrates in pseudo-code the Execute Recipe routine. Included is the Check_Task case statement which includes the routines for alarm, fault, and term.

APPENDIX A: Check Task Pseudo Code

```
Check_Task( )                          /* Process Controller Check Task Pseudo-
Code */
    {
    init_check_task( );                /* Initialize tables and data */
    FOREVER
        {
        msg_ptr = Get_Msg( );          /* give up execution & wait for msg */
        if (msg_type <>CHECK_REQUEST)  /* see if for me... */
```

```
            {
            Exception(BAD_MSG);                    /* not for me... report exception */
            continue;                              /* go back to main loop */
            }
        for(cnt=0,cnt<step.analog_cnt,++cnt)       /* LOOP ANALOGS */
            if (Check_Analog(cnt))                 /* see if problem */
                Build_Alarm_Msg(ANALOG,cnt);       /* build up msg for Execute Recipe */
        for(cnt=0,cnt<step.digital_cnt,++cnt)      /* LOOP DIGITALS */
            if (Check_Digital(cnt))                /* see if problem */
                Build_Alarm_Msg(DIGITAL,cnt);      /* build up msg for Execute Recipe */
        for(cnt=0,cnt<step.enum_cnt,++cnt)         /* LOOP ENUMERATEDS */
            if (Check_Enum(cnt))                   /* see if problem */
                Build_Alarm_Msg(ENUM,cnt);         /* build up msg for Execute Recipe */
        }                                          /* end of FOREVER loop */
}                                                  /* end of Check_Task( ) */
```

APPENDIX B: Output Task Pseudo Code

```
Output_Task( )                        /* Process Controller Output Task Pseudo-Code */
    {
    init_output_task( );                           /* Initialize tables and data */
    FOREVER
        {
        msg_ptr = Get_Msg( );                      /* give up execution & wait for msg */
        if (msg_type <>OUTPUT_REQUEST)             /* see if for me... */
            {
            Exception(BAD_MSG);                    /* not for me... report exception */
            continue;                              /* go back to main loop */
            }
        for (cnt=1,cnt<=NUM_RDAC,++cnt)            /* loop for all RDACs */
            {
            Send_Output(RDAC(cnt),output_data);    /* send new data to RDACs */
            }
        }                                          /* end of FOREVER loop */
    }                                              /* end of Output_Task( ) */
```

APPENDIX C: Input Task Pseudo Code

```
Input_Task( )                        /* Process Controller Input Task Pseudo-Code */
    {
    init_input_task( );                  /* Initialize tables and data */
    for (cnt=1,cnt<=NUM_RDAC,++cnt)       /* loop for all RDACs */
        {
        Send_Input_Request(RDAC(cnt));    /* send request for new data*/
        }
    FOREVER
        {
        msg_ptr = Get_Msg( );             /* give up execution & wait for msg */
        if (msg_type <>INPUT_RESPONCE)    /* see if for me... */
            {
            Exception(BAD_MSG);           /* not for me... report exception */
            continue;                     /* go back to main loop */
            }
        Store_New_Data(msg_ptr);          /* store data in Input Data Table */
        Send_Msg(SAFETY);                 /* flag Safety Task of new data */
        Send_Input_Request(msg.rdac);     /* send request for new data*/
        }                                 /* end of FOREVER loop */
    }                                     /* end of Input_Task( ) */
```

APPENDIX D: Execute Recipe Pseudo Code

```
Execute_Recipe( )                    /* Execute Recipe Pseudo-Code */
    {
    init_exec_rec( );                    /* Initialize tables and data */
    FOREVER
        {
        msg_ptr = get_msg( );             /* Give up execution & wait for msg */
        switch (msg_type)                 /* see which msg */
            {
            case CHECK_TASK:              /* Check Task Msg */
                switch (CONDITION_TYPE)
                    {
                    case ALARM:
                        Send_Stream_5_task(ALARM);
                        break;             /* send alarm to stream 5 */
```

```
        case FAULT:
            Send_Stream_5_task(FAULT);
            Next_Step(FAULT);            /* change to fault step */
            break;                        /* send fault to stream 5 */
        case TERM:
            if (HOLD_FLAG || SINGLE_FLAG) /* stay on this step? */
                END_OF_STEP=TRUE;         /* flag ready to switch steps */
            else Next_Step(TERM);         /* start up next step */
            break;
        default:
            break;
        }
        break;
    case SAFETY_TASK:                     /* Safety Task Msg */
        Send_Stream_5_task(SAFETY);       /* send safety to stream 5 */
        Safe_State( );                    /* shut down to safe state */
        break;

case TIMER_TASK:                      /* Timer Task Msg */
        if (!HOLD_FLAG)                   /* see if in hold */
        {                                 /* if not inc time count */
            ++time_cnt;                   /* inc step time counter */
            if (time_cnt == step_term_time) /* see if at end of step */
                Next_Step(TERM);          /* start up next step */
        }
        Call_Msg(TIMER);                  /* set up next timer msg */
        break;
    case STREAM_2_REPORT:                 /* Stream 2 Report Enable/Disable */
        if (ENABLE)                       /* see if turn on or off */
            report_flag=TRUE;             /* turn on... TRUE */
        else report_flag=FALSE;           /* default... FALSE */
        break;
    case STREAM_2_SERVICE:                /* Stream 2 Service Program */
                                          /* or "recipe tweak" */
        Tweak_Recipe(msg_ptr);            /* set new data */
        break;
    case STREAM_2_CMD:                    /* Stream 2 Remote Command */
        switch(CMD)                       /* see which command */
        {
            case RUN:                     /* Run command */
                if (!RUN_FLAG)
```

```c
        {                        /* not running... start it up */
        Reply_Good(msg_ptr);     /* tell stream 2 everything OK */
        RUN_FLAG=TRUE;           /* set running */
        HOLD_FLAG=FALSE;         /* make sure not in hold */
        SINGLE_FLAG=FALSE;       /* make sure not in single step */
        Next_Step(START);        /* do first step */
        }
    else if (HOLD_FLAG)          /* see if in hold */
        {
        Reply_Good(msg_ptr);     /* tell stream 2 everything OK */
        HOLD_FLAG=FALSE;         /* yes... take it out of hold */
        SINGLE_FLAG=FALSE;       /* make sure not in single step */
            if (END_OF_STEP)        /* see if at end of step */
                Next_Step(TERM);    /* start up next step */
            }
        else Reply_Bad(msg_ptr); /* tell stream 2 already running */
        break;

case HOLD:
        if (RUN_FLAG)
            {                        /* yes... put it in hold */
            Reply_Good(msg_ptr);/* tell stream 2 everything OK */
            HOLD_FLAG=TRUE;      /* put it in hold */
            }
        else Reply_Bad(msg_ptr);/* tell stream 2 not running */
        break;
    case STOP:                   /* or ABORT */
        if (RUN_FLAG)
            {                        /* yes... stop... */
            Reply_Good(msg_ptr);/* tell stream 2 everything OK */
            HOLD_FLAG=FALSE;/* no hold */
            RUN_FLAG=FALSE;      /* not running */
            }
        else Reply_Bad(msg_ptr);/* tell stream 2 not running */
        break;
    case SINGLE_STEP:            /* single step */
        if (!SINGLE_FLAG) SINGLE_FLAG=TRUE /* set flag */
        if (!RUN_FLAG)
            {                        /* not running... start it up */
```

```
                RUN_FLAG=TRUE;              /* set running */
                HOLD_FLAG=FALSE;            /* make sure not in hold */
                Next_Step(START);           /* do first step */
                }
            else if (END_OF_STEP)           /* see if at end of step */
                Next_Step(TERM);            /* start up next step */
            Reply_Good(msg_ptr);            /* tell stream 2 everything OK */
            break;
                default:
                    Reply_Bad(msg_ptr);     /* tell stream 2 not running */
                    break;
                }
            break;
        case STREAM_1_STATUS:               /* get status */
            Reply_Msg(msg_ptr);             /* send status to SECS */
            break;

case STREAM_7_DNLOAD:               /* download new process program */
            if (RUN_FLAG)
                {
                Reply_Bad(msg_ptr);         /* tell stream 7 running can't do */
                }
            else
                {
                New_Recipe(msg_ptr);        /* store new recipe */
                Reply_Good(msg_ptr);        /* tell stream 7 everything OK */
                }
            break;
        default:
            Exception(BAD_MSG);             /* flag as bad msg */
            break;
            }                               /* end of msg switch */
        }                                   /* end of FOREVER loop */
    }                                       /* end of Execute_Recipe() */

Next_Step( Step_Switch )                    /* Switch Steps */
    {
    switch (Step_switch)                    /* what type of switch */
        {
```

```
case START:                                    /* start at beginning of recipe */
    if (Check_Recipe()==BAD)                   /* see if valid recipe */
    {                                          /* RECIPE NOT VALID */
        RUN_FLAG=FALSE;                        /* reset run flag */
        Send_Stream_5_task(ALARM);             /* send alarm to stream 5 */
    }
    else
    {                                          /* RECIPE VALID */
        step_ptr = recipe.first_step;          /* point to first step */
        pending_ptr=Make_Out_Table(step_ptr);  /* make pending outputs */
        Send_to_Safety(pending_ptr);           /* give to Safety Task for check */
    }
    break;
case TERM:                                     /* switch to next step in recipe */
    Report_Data(step_ptr);                     /* report any step data */
    if (Check_Branch(step_ptr))                /* see if branch data TRUE */
        step_ptr = step.branch_step;           /* point to branch step */
    else
    {
        old_step = step_ptr;                   /* save old ptr for end step */
        step_ptr = step.next_step;             /* point to next step */
        if (Check_Sub(step_ptr))               /* check for subroutine */
        {
            Stack_Step(step_ptr);              /* save return ptr */
            step_ptr = step.sub_step;          /* point to subroutine step */
        }
        else if (step_ptr==END_STEP)           /* see if end step */
        {
            step_ptr=Copy_Step(old_step);      /* make copy of last step */
            HOLD_FLAG=FALSE;                   /* reset all flags */
            RUN_FLAG=FALSE;
            SINGLE_FLAG=FALSE;
            break;                             /* exit... current step is now copy */
        }
        else if (step_ptr==RETURN_STEP)        /* see if return step */
            step_ptr=UnStack_Step();           /* get calling step */
    }
    pending_ptr=Make_Out_Table(step_ptr);      /* make pending outs */
    Send_to_Safety(pending_ptr);               /* pass to Safety Task */
    break;
```

```
case FAULT:                                      /* switch to fault step */
    step_ptr=step.fault_step;                    /* point to fault step */
    pending_ptr=Make_Out_Table(step_ptr);        /*make pending outs */
    Send_to_Safety(pending_ptr);                 /* pass to Safety Task */
    break;
default:
    Exception(BAD_SWITCH_CODE);                  /* flag software errors */
    break;
}                                                /* end of switch */
}                                                /* end of Next_step */
```

We claim:

1. A method for controlling a parameter in a multi-parameter process comprising the steps of:
   setting the parameter to a desired value;
   producing an electrical signal related to said parameter;
   checking the magnitude of said signal against first and second sets of predetermined limits, wherein said first set of limits is wider than and includes said second set of limits; and
   continuing said process if said signal is within said first set of limits;
   recording said signal when said signal is within a guard band, viz. within said first set of limits and outside of said second set of limits;
   terminating said process if said signal is not within said first set of limits, indicating a fault condition.

2. The method as set forth in claim 1 wherein said limits correspond to predetermined, fixed percentages of said desired value.

3. The method as set forth in claim 1, wherein at least two parameters are controlled by performing all of said steps on each parameter, and further comprising the step of:
   changing the limits for the magnitude of the signal for one parameter in accordance with the magnitude of the signal for another parameter.

4. The method as set forth in claim 3 wherein said process is divided into a plurality of intervals and wherein said setting and checking steps are performed at least once in each interval.

5. The method as set forth in claim 4 wherein said setting and checking steps are performed several times in each interval.

6. The method as set forth in claim 1 wherein said process is divided into a plurality of intervals and wherein said setting and checking steps are performed at least once in each interval.

7. The method as set forth in claim 6 wherein said setting and checking steps are performed several times in each interval.

* * * * *